March 23, 1926.
T. V. BREYER
1,577,686
FLOAT OPERATED CIRCUIT CLOSER
Filed July 24, 1924
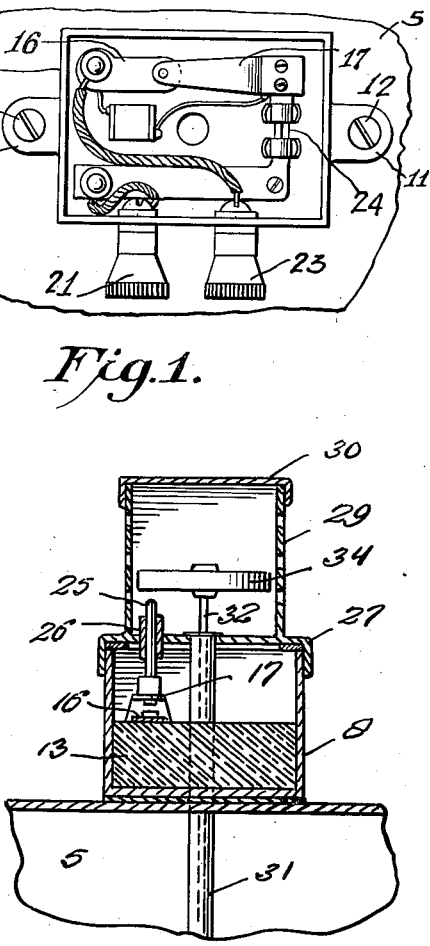
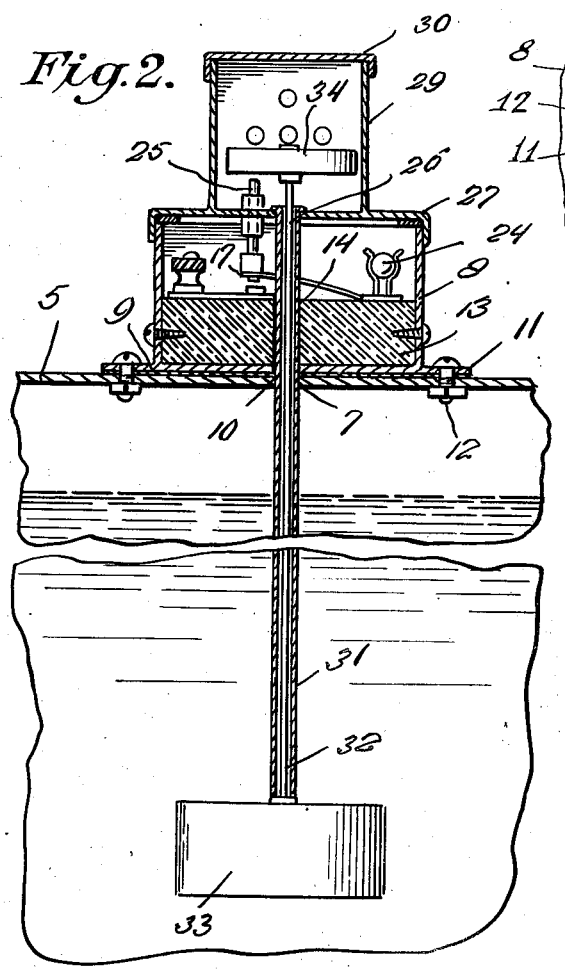
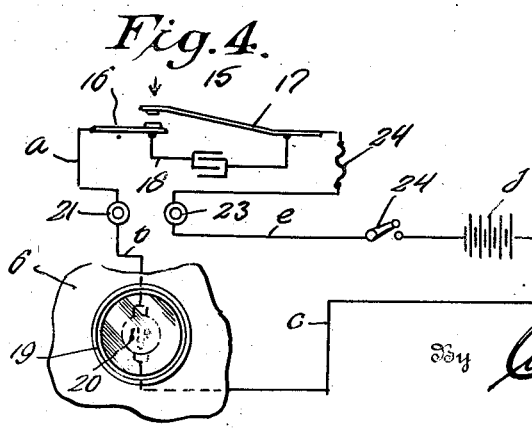
T. V. Breyer,
Inventor
By Clarence A. O'Brien
Attorney Patented Mar. 23, 1926.

1,577,686

UNITED STATES PATENT OFFICE.

THEODORE V. BREYER, OF NEW PHILADELPHIA, OHIO.

FLOAT-OPERATED CIRCUIT CLOSER.

Application filed July 24, 1924. Serial No. 727,981.

*To all whom it may concern:*

Be it known that I, THEODORE V. BREYER, a citizen of the United States, residing at New Philadelphia, in the county of Tuscarawas and State of Ohio, have invented certain new and useful Improvements in a Float-Operated Circuit Closer, of which the following is a specification.

This invention relates generally to the art of electric signalling and has more particular reference to a level indicator for fuel tanks primarily adapted for association with the engine fuel tank of vehicles wherein the operator of the vehicle is warned when the supply of fuel within the tank becomes deplenished to a certain extent in order that the fuel tank may be replenished and in order to prevent the running out of fuel while upon the road, which as is well known is a very great inconvenience.

The primary object of my invention resides in the provision of a level indicator of the foregoing character which may be associated with the fuel tank employed in conjunction with practically all types of motor vehicles and one that may be installed without any great difficulty and one that will operate efficiently under all conditions.

A further object of my invention resides in the provision of a device as above set forth that constitutes the provision of an electrical switch that is mounted upon the fuel tank and that is actuated to closed position by a flat member disposed in the vent duct for completing the circuit between a battery and an indicating lamp preferably disposed upon the instrument board of the vehicle.

A further and important object of the invention is to provide a level indicator for fuel tanks wherein the same may be readily removed from the tank and entirely disassembled for cleaning, repair or renewal purposes.

With the foregoing and other objects in view as the nature of the invention will be better understood the same comprises the novel form, combination and arrangement of parts hereinafter more fully described, shown in the accompanying drawing and claimed.

In the drawings wherein like reference characters indicate corresponding parts throughout the several views:

Figure 1 is a top plan view of said switch casing, the entire cover thereof being removed for more clearly disclosing the switch element.

Figure 2 is a detail vertical sectional view through the switch and its actuating means associated with the fuel tank.

Figure 3 is a fragmentary vertical sectional view taken at right angles to the construction shown in Figure 2, and Figure 4 is a diagrammatic view of the wiring system employed in conjunction with the present invention.

Now having particular reference to the drawing, 5 in Figures 1 to 3 inclusive designates the usual fuel supply tank of a motor vehicle, and 6 in Figure 4 the instrument board of the vehicle.

In carrying out the present invention, the fuel tank 5 is formed upon its top side with a circular opening 7 directly over which is disposed a switch casing 8 preferably of angular configuration, the bottom wall 9 of which is formed with an opening 10 for registration with the opening 11 in said tank 5. As clearly shown in Figures 1 to 3 inclusive said switch casing 8 is provided at its lower end and upon diametrically opposite sides with lateral ears 11 that are provided with openings whereby said switch casing may be bolted, riveted or otherwise suitably secured as at 12 to said tank 5.

Removably secured within the switch casing 8 is an insulating block 13 of suitable material preferably fiber or porcelain and formed centrally through which is a passage 14 that registers with the openings 10 and 7 in the bottom wall of the casing and the tank 5 respectively.

Disposed upon the top side of said insulating block 13 is a normally open electric switch designated generally 15, the same including a stationary contact 16 and a spring contact 17 normally disposed out of engagement with said stationary contacts as clearly shown in Figures 2, 3 and 4. Electrically connected between said contacts 16 and 17 is a suitable form of condenser 18 to prevent sparking between the points when they are brought into and out of contact with each other.

Disposed within an opening formed in the instrument board 6 of the vehicle is a lamp casing 19 within which is an electric lamp 20, one contact of which is electrically connected with the stationary contact 16 of the switch 17 through the medium of wires *a* and *b* that are in turn connected with each other through the medium of a binding post 21 carried by said switch casing 8.

The other contact of said lamp 20 is electrically connected as at c with one pole of the usual vehicle storage battery d, the outer pole of which is electrically connected through the line e with the spring contact 17 of said switch, there being included in said line a hand switch 22 preferably disposed upon the instrument board wherein the circuit from the battery may be disconnected at will, there being also included in this line of circuit a binding post 23 that is also carried by the switch casing 8 and additionally within this line is fuse 24 for an obvious purpose.

Connected to the forward end of the spring contact 17 is a vertically extending pin 25 that is guided in a sleeve 26 positioned within an opening of a lid 27 for said switch casing 8, there being formed upon said lid 27 a housing 29, the upper end of which is opened and upon which is fitted a lid 30.

Extended through an opening in the lid 27 of the switch casing 8 and through the registering openings 14, 10 and 7 of the insulating block, the bottom wall and tank respectively, is an elongated tube 31 that extends downwardly within said tank as clearly shown in Figure 3, there being disposed for rectilinear sliding movement through this tube a rod 32 upon the lower end of which is a float 33 and upon the upper end of which is a circular disc 34 that is adapted to engage the pin 25 of the switch contact 17 for depressing this contact into engagement with the stationary contact 6 when the float 33 moves downwardly within the tank due to the deplenishing of the fuel therein for obviously closing the circuit to the lamp 20 when the fuel supply has reached a certain low level for obviously indicating to the operator of the vehicle that the fuel supply is at a low level and that he should replenish the same.

From the foregoing description when considered in conjunction with the accompanying drawing it will be seen that I have provided a highly novel and efficient level indicator for fuel tank and one that will meet with all the requirements for a successful commercial use.

Minor changes may be made in the invention without departing from the spirit and scope of the appended claim.

Having thus described the invention, what I claim as new and desire to secure by Letters Patent is:

In combination, a fuel tank, a casing disposed upon the tank, a partition in the casing dividing the same into an upper compartment and a lower compartment, said upper compartment having a vent opening, a tube extending through the partition, through the lower compartment, and a distance down into the tank, a rod slidable through the tube, a float on the rod within the tank, an abutment on the rod within the upper compartment of the casing, a normally opened circuit closer in the lower compartment of the casing, a sleeve extending through the partition, a plunger slidable through the sleeve and having one end in the path of the movement of the abutment in the upper compartment and having its other end adapted for engagement with the circuit closer in the lower compartment so that when the float recedes to a predetermined level, said abutment will engage the plunger to actuate the circuit closer to a closed position.

In testimony whereof I affix my signature.

THEODORE V. BREYER.